(12) United States Patent
Farrell

(10) Patent No.: US 11,117,002 B2
(45) Date of Patent: Sep. 14, 2021

(54) BRAKE ASSEMBLY FOR USE WITH RETRACTABLE LIFELINE ASSEMBLY

(71) Applicant: Pure Safety Group, Inc., Pasadena, TX (US)

(72) Inventor: William Leo Farrell, Kent, WA (US)

(73) Assignee: Pure Safety Group, Inc., Pasadena, TX (US)

( * ) Notice: Subject to any disclaimer, the term of this patent is extended or adjusted under 35 U.S.C. 154(b) by 317 days.

(21) Appl. No.: 16/269,711

(22) Filed: Feb. 7, 2019

(65) Prior Publication Data

US 2019/0247683 A1 Aug. 15, 2019

Related U.S. Application Data

(60) Provisional application No. 62/628,607, filed on Feb. 9, 2018.

(51) Int. Cl.
| | |
|---|---|
| *A62B 35/04* | (2006.01) |
| *A62B 35/00* | (2006.01) |
| *F16F 7/00* | (2006.01) |
| *F16F 7/12* | (2006.01) |

(52) U.S. Cl.
CPC .......... *A62B 35/04* (2013.01); *A62B 35/0056* (2013.01); *A62B 35/0093* (2013.01); *F16F 7/003* (2013.01); *F16F 7/12* (2013.01)

(58) Field of Classification Search
CPC . A62B 35/04; A62B 35/0056; A62B 35/0093; A62B 35/005; A62B 35/0043; A62B 35/0081; A62B 35/0087; A62B 1/10; A62B 1/08; F16F 7/003; F16F 7/12; F16F 7/02; F16F 9/12; F16F 15/10; F16D 63/006; F16D 63/008; E04G 21/3204
See application file for complete search history.

(56) References Cited

U.S. PATENT DOCUMENTS

| | | | | | |
|---|---|---|---|---|---|
| 3,352,384 | A | * | 11/1967 | Stevens, Jr. .............. | B66D 5/00 188/82.7 |
| 3,442,466 | A | * | 5/1969 | Fritsche .................. | B60R 22/38 242/379.1 |
| 3,616,882 | A | * | 11/1971 | White ..................... | F04C 2/104 477/182 |
| 4,487,292 | A | * | 12/1984 | Smith ...................... | A62B 1/10 182/234 |
| 4,511,123 | A | * | 4/1985 | Ostrobrod .......... | A62B 35/0093 182/234 |
| 4,538,703 | A | * | 9/1985 | Ellis ........................ | E06C 7/186 182/10 |
| 4,877,110 | A | * | 10/1989 | Wolner .............. | A62B 35/0093 182/232 |
| 5,251,727 | A | * | 10/1993 | Loeffler .............. | F16D 55/2265 188/205 A |

(Continued)

*Primary Examiner* — Alvin C Chin-Shue
*Assistant Examiner* — Shiref M Mekhaeil
(74) *Attorney, Agent, or Firm* — Dicke, Billig & Czaja, PLLC

(57) ABSTRACT

A brake assembly comprises a brake plate including a plurality of radially-extending brake tabs, and an extension member extending at least partially through the brake plate. The extension member is movable relative to the brake plate such that the extension member is configured to successively engage the brake tabs. The brake assembly enables one or more forces to be managed or controlled throughout a braking event, such as a fall arrest event.

19 Claims, 10 Drawing Sheets

(56) References Cited

U.S. PATENT DOCUMENTS

| | | | | |
|---|---|---|---|---|
| 5,771,993 A * | 6/1998 | Anderson | | A62B 35/04 |
| | | | | 182/18 |
| 6,120,046 A * | 9/2000 | Daly | | B62D 7/224 |
| | | | | 267/273 |
| 6,279,682 B1 * | 8/2001 | Feathers | | A62B 35/0093 |
| | | | | 182/239 |
| 6,810,997 B2 * | 11/2004 | Schreiber | | A62B 1/10 |
| | | | | 182/233 |
| 8,528,694 B2 * | 9/2013 | Meillet | | A62B 35/0093 |
| | | | | 182/3 |
| 8,739,929 B2 | 6/2014 | Meillet et al. | | |
| 8,746,519 B2 * | 6/2014 | Young | | A45F 5/004 |
| | | | | 224/162 |
| 8,800,719 B2 * | 8/2014 | Auston | | A62B 35/0093 |
| | | | | 182/234 |
| 8,991,556 B2 * | 3/2015 | Auston | | A62B 35/0093 |
| | | | | 182/239 |
| 9,132,301 B2 * | 9/2015 | Jones | | F16D 59/00 |
| 9,889,322 B2 * | 2/2018 | Casebolt | | A62B 35/0093 |
| 9,919,904 B2 * | 3/2018 | Gottschling | | B66D 3/20 |
| 10,556,138 B2 * | 2/2020 | Fegley | | A62B 1/10 |
| 10,653,903 B2 * | 5/2020 | Jones | | A62B 35/04 |
| 10,661,106 B2 * | 5/2020 | Choate | | A62B 35/0093 |
| 10,744,354 B2 * | 8/2020 | Choate | | A62B 35/04 |
| 2005/0224245 A1 * | 10/2005 | Kamimura | | F16D 7/021 |
| | | | | 173/216 |
| 2007/0151805 A1 * | 7/2007 | Betcher | | A62B 35/0093 |
| | | | | 182/239 |
| 2007/0272509 A1 * | 11/2007 | Peschek | | F16D 51/10 |
| | | | | 192/90 |
| 2010/0021305 A1 * | 1/2010 | Martensson | | F01D 5/34 |
| | | | | 416/186 R |
| 2010/0175962 A1 * | 7/2010 | Kawai | | F16D 47/04 |
| | | | | 192/16 |
| 2010/0257734 A1 * | 10/2010 | Wei | | B21D 53/02 |
| | | | | 29/890.03 |
| 2011/0005881 A1 * | 1/2011 | Kawai | | F16D 41/088 |
| | | | | 192/45.01 |
| 2012/0205516 A1 * | 8/2012 | Jaumann | | F16M 11/16 |
| | | | | 248/636 |
| 2012/0305359 A1 * | 12/2012 | Sato | | B60N 2/168 |
| | | | | 192/45.001 |
| 2013/0220760 A1 * | 8/2013 | Tsao | | F16D 41/02 |
| | | | | 192/45.1 |
| 2013/0277631 A1 * | 10/2013 | Luntz | | B66C 3/046 |
| | | | | 254/391 |
| 2014/0251731 A1 * | 9/2014 | Jones | | A62B 35/04 |
| | | | | 182/231 |
| 2016/0091036 A1 * | 3/2016 | Shank | | B60T 1/005 |
| | | | | 188/18 R |
| 2016/0200426 A1 * | 7/2016 | Didey | | F16H 1/006 |
| | | | | 74/406 |
| 2017/0096217 A1 * | 4/2017 | Didey | | F16H 55/10 |
| 2017/0133789 A1 * | 5/2017 | Haegele | | H01R 13/6275 |
| 2017/0158313 A1 * | 6/2017 | Tilloy | | F16H 25/2015 |
| 2018/0100553 A1 * | 4/2018 | Cho | | F16D 65/09 |
| 2019/0002254 A1 * | 1/2019 | Dennis | | F16D 55/46 |
| 2019/0126737 A1 * | 5/2019 | Lo | | B60K 6/52 |
| 2019/0145472 A1 * | 5/2019 | Wahrisch | | F16D 49/16 |
| | | | | 188/135 |
| 2019/0162257 A1 * | 5/2019 | Shih | | F16D 59/00 |
| 2019/0209877 A1 * | 7/2019 | Farrell | | B65H 75/4431 |
| 2019/0275356 A1 * | 9/2019 | Jones | | A62B 1/10 |
| 2019/0301550 A1 * | 10/2019 | Yamaguchi | | F16D 65/123 |

* cited by examiner

BRAKE ASSEMBLY FOR USE WITH RETRACTABLE LIFELINE ASSEMBLY

CROSS-REFERENCE TO RELATED APPLICATIONS

This application claims the benefit of U.S. Provisional Application Ser. No. 62/628,607, filed Feb. 9, 2018, which is incorporated in its entirety herein by reference.

BACKGROUND

Known safety equipment is used to reduce a likelihood of a fall and/or injuries associated with a fall, particularly at relatively dangerous heights. Some safety equipment may include, for example, a retractable lifeline that is connectable to an anchor point. Examples of retractable lifelines include horizontal lifelines and self-retracting lifelines.

Braking mechanisms may be used to control how a lifeline is paid out, how a lifeline is retracted, and/or how energy is absorbed should a fall occur. At least some known braking mechanisms, however, are friction-based and, thus, are prone to erosion over time, potentially compromising the amount of control the braking mechanism has on the retractable lifeline. An eroded friction-based braking mechanism, for example, may not allow a user to sufficiently limit fall arrest forces applied to the lifeline and/or to the user.

For the reasons stated above and for other reasons stated below, which will become apparent to those skilled in the art upon reading and understanding the present specification, a need exists for the present invention.

SUMMARY

The above-mentioned problems associated with prior devices are addressed by embodiments of the disclosure and will be understood by reading and understanding the present specification. The following summary is made by way of example and not by way of limitation.

Examples of the disclosure enable one or more forces to be managed or controlled throughout a braking event (e.g., a fall arrest event). In one aspect, a brake assembly is provided. The brake assembly comprises a brake plate including a plurality of radially extending brake tabs, and an extension member extending at least partially through the brake plate. The extension member is movable relative to the brake plate such that the extension member is configured to successively engage the brake tabs.

In another aspect, a retractable lifeline assembly is provided. The retractable lifeline assembly includes a rotatable member, a brake plate including a plurality of radially-extending brake tabs, and an extension member extending between the rotatable member and the brake plate. The extension member is configured to successively engage the brake tabs when a first rotational force is applied to the rotatable member in a first direction and/or a second rotational force is applied to the brake plate in an opposing second direction.

In yet another aspect, a method is provided for manufacturing a retractable lifeline assembly. The method includes extending an extension member at least partially through a brake plate including a plurality of radially-extending brake tabs such that the extension member is configured to successively engage the brake tabs, and coupling the extension member to a rotatable member having an axis of rotation such that the extension member revolves about the axis of rotation when the rotatable member is rotated about the axis of rotation.

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

BRIEF DESCRIPTION OF THE DRAWINGS

The accompanying drawings are included to provide a further understanding of embodiments and are incorporated in and constitute a part of this specification. The drawings illustrate embodiments and together with the description serve to explain principles of embodiments. Other embodiments and many of the intended advantages of embodiments will be readily appreciated as they become better understood by reference to the following detailed description. In accordance with common practice, the various described features are not drawn to scale but are drawn to emphasize specific features relevant to the present disclosure. Reference characters denote like elements throughout the Figures and the text.

DETAILED DESCRIPTION

In the following detailed description, reference is made to the accompanying drawings, which form a part hereof, and in which is shown by way of illustration embodiments in which the disclosure may be practiced. In this regard, directional terminology, such as "top," "bottom," "front," "back," "leading," "trailing," etc., is used with reference to the orientation of the Figure(s) being described. Because components of embodiments can be positioned in a number of different orientations, the directional terminology is used for purposes of illustration and is in no way limiting. It is to be understood that other embodiments may be utilized and structural or logical changes may be made without departing from the scope of the present invention. The following detailed description, therefore, is not to be taken in a limiting sense, and the scope of the present invention is defined by the appended claims.

It is to be understood that other embodiments may be utilized and mechanical changes may be made without departing from the spirit and scope of the present disclosure. The following detailed description is, therefore, not to be taken in a limiting sense.

The present disclosure relates to safety equipment and, more particularly, to a brake assembly that may be used with a retractable lifeline assembly. Examples of retractable lifelines include horizontal lifelines and self-retracting lifelines. Examples described herein include a brake plate and an extension member extending at least partially through the brake plate. The brake plate includes a plurality of brake tabs that are successively engaged by the extension member as one or more forces urge the extension member to move in a first direction and/or the brake plate to rotate in a second direction.

The brake tabs may be circumferentially spaced about a center of the brake plate and extend radially from the center of the brake plate. In some examples, the extension member is circumferentially movable (e.g., revolvable) about the center of the brake plate, and/or the brake plate is rotatable about the center of the brake plate. In this manner, the extension member may move generally along an arcuate guide path that is perpendicular to the brake tabs. While the examples described herein are described using a round or circular brake plate, one of ordinary skill in the art would understand and appreciate that the brake plate may have any shape or configuration that enables a brake assembly to function as described herein. Moreover, while the examples described herein are described in the context of safety equipment and retractable lifeline assemblies, in particular, one of ordinary skill in the art would understand and appreciate that the brake assembly may be used for various purposes in a wide range of contexts, including both safe and precarious situations, in which a fail-safe against rotation may be used.

Figure 1:
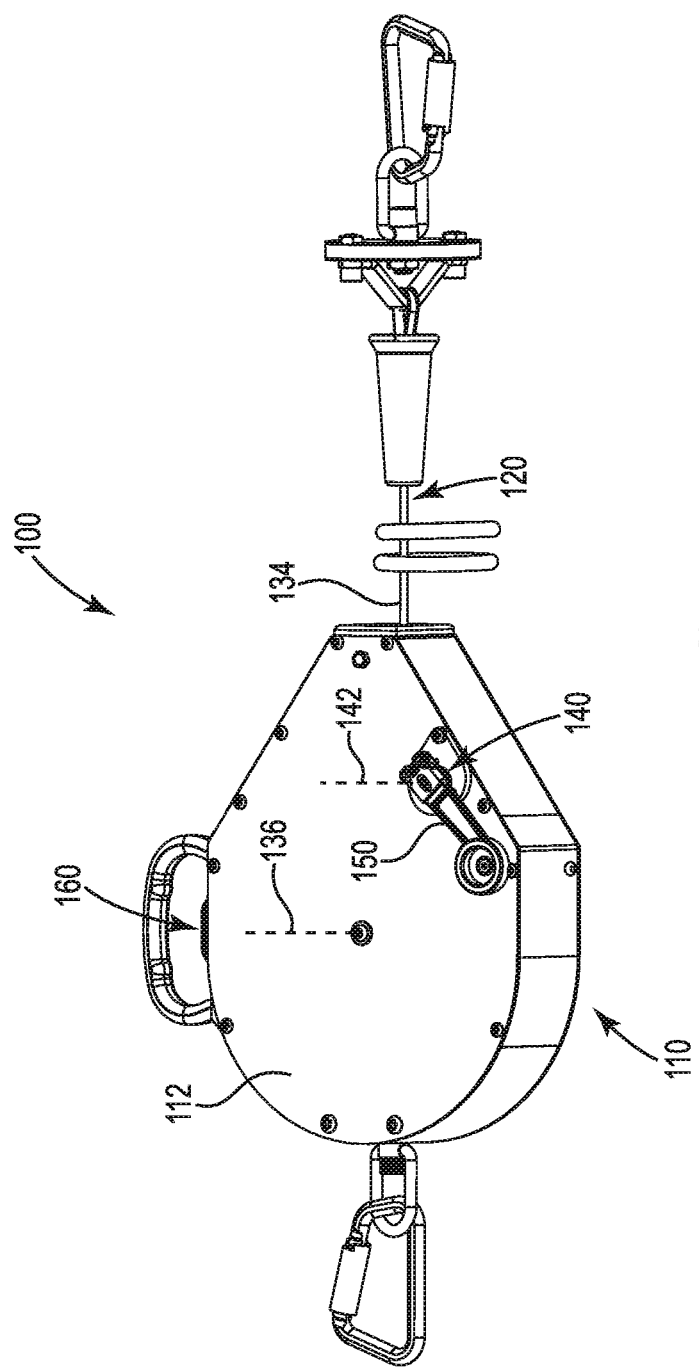
FIG. 1 includes a perspective view of an example retractable lifeline assembly.

FIG. 1 shows an example retractable lifeline system or assembly 100, which is a horizontal lifeline assembly, including a housing 110. The housing 110 includes one or more sidewalls 112 that are spaced to form a cavity therebetween. The sidewalls 112 may be spaced, for example, to house one or more components, such as a lifeline 120. Although any suitable retractable lifeline assembly could be used, an example is disclosed in U.S. patent application Ser. No. 16/230,910, filed Dec. 21, 2018, which is incorporated in its entirety herein by reference.

The lifeline 120 is extendable about and/or from a drum or rotatable member 130 (shown, e.g., in FIG. 2) in the housing 110. The lifeline 120 may have, for example, a first segment 132 extending about the rotatable member 130 inside the housing 110 (e.g., an inner segment), and a second segment 134 extending from the rotatable member 130 outside the housing 110 (e.g., an outer segment). In some examples, the lifeline 120 extends through an opening defined by and/or through one or more sidewalls 112. Example lifelines 120 include, without limitation, a cable, a wire, a cord, a webbing, and/or a rope.

A proportion of the lifeline 120 in the first segment 132 and/or in the second segment 134 changes as the rotatable member 130 is rotated about its axis of rotation 136 (e.g., a first axis of rotation). For example, a proportion of the lifeline 120 in the first segment 132 may increase and a proportion of the lifeline 120 in the second segment 134 may decrease when the rotatable member 130 rotates in a first direction (e.g., a clockwise direction), and a proportion of the lifeline 120 in the first segment 132 may decrease and a proportion of the lifeline 120 in the second segment 134 may increase when the rotatable member 130 rotates in a second direction (e.g., a counterclockwise direction).

In some examples, the retractable lifeline assembly 100 includes a shaft or shank 140 that may be used to rotate the rotatable member 130. The shank 140 may include an end that is sized, shaped, and/or configured to be held in a clamp or chuck. A drill or driver including a clamp or chuck, for example, may be used to rotate the shank 140. In some examples, the shank 140 extends outward from and generally perpendicular to an outer surface of a sidewall 112. Example shanks 140 include, without limitation, a round shank, a triangle shank, a square shank, and/or a hex shank. Additionally or alternatively, the shank 140 may include one or more walls defining an opening sized to receive a shaft or shank.

Figure 2:
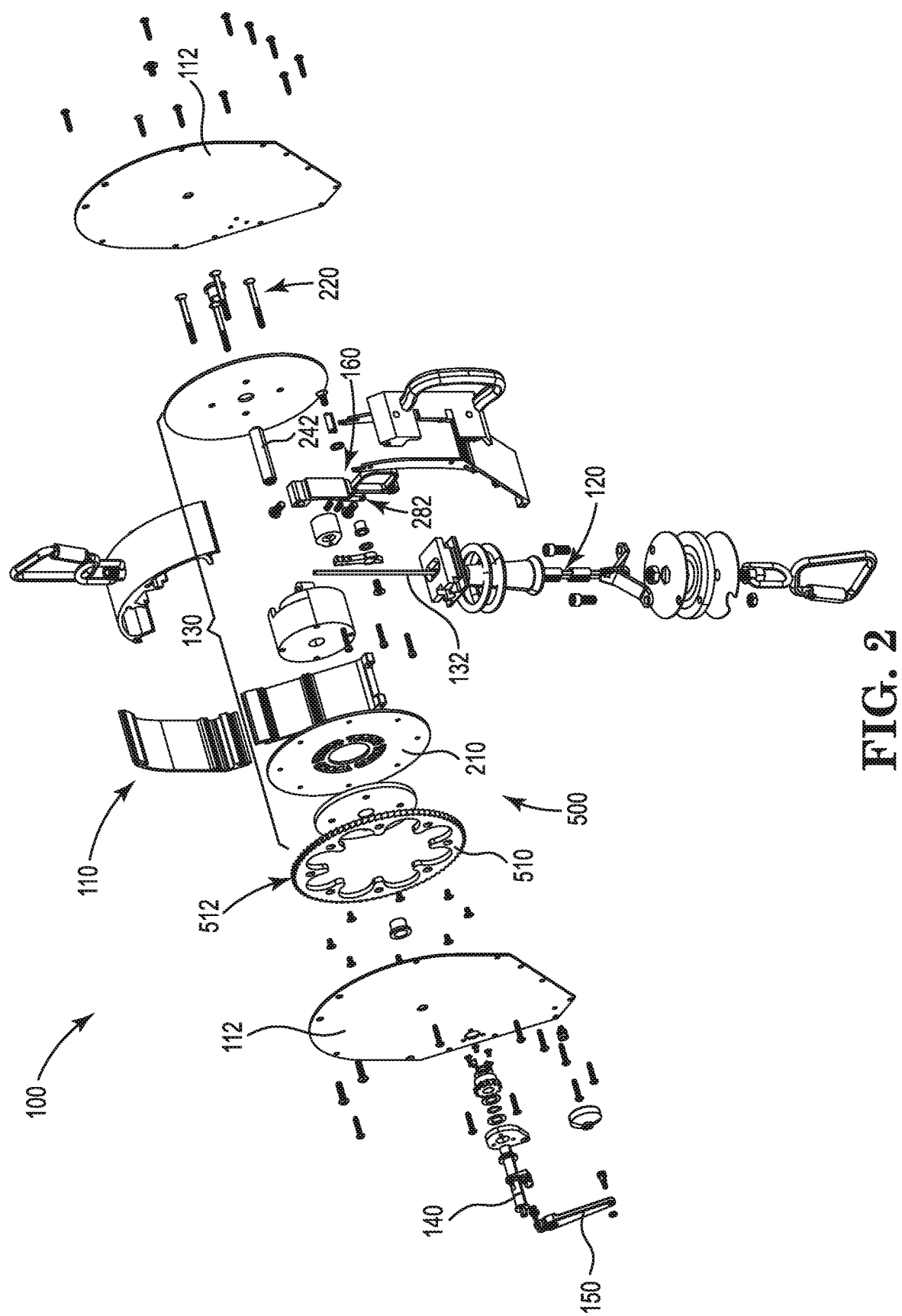
FIG. 2 includes an exploded perspective view of the retractable lifeline assembly shown in FIG. 1.

The shank 140 is coupled to the rotatable member 130 such that the rotatable member 130 rotates about the first axis of rotation 136 as the shank 140 is rotated about its axis of rotation 142 (e.g., a second axis of rotation), and/or such that the shank 140 rotates about the second axis of rotation 142 as the rotatable member 130 is rotated about the first axis of rotation 136. In some examples, as shown in FIG. 2, the shank 140 is coupled to the rotatable member 130 using a gear train configured to create a mechanical advantage (e.g., for rotating the rotatable member 130). In this manner, the shank 140 allows the lifeline 120 to be efficiently wound around and/or unwound from the rotatable member 130.

The retractable lifeline assembly 100 may include a crank 150 configured to cooperate with and/or engage the shank 140. The crank 150 may include one or more walls defining an opening sized to receive the shank 140. Additionally or alternatively, the crank 150 may include a shaft or shank. The crank 150 may be positioned to engage the shank 140 such that the shank 140 rotates as the crank 150 is rotated. In some examples, the crank 150 acts as a lever that is pivotable about the crank 150 to create a mechanical advantage (e.g., for rotating the shank 140). In this manner, the crank 150 allows the shank 140 to be efficiently rotated (e.g., for winding the lifeline 120 around and/or unwinding the lifeline 120 from the rotatable member 130).

The retractable lifeline assembly 100 has a plurality of operating configurations including an unlocked configuration and a locked configuration. When the retractable lifeline assembly 100 is in the unlocked configuration, the rotatable member 130 is allowed to freely rotate in a plurality of directions. For example, the rotatable member 130 may be selectively rotated in the first direction (e.g., for winding the lifeline 120 around the rotatable member 130) or in the second direction (e.g., for unwinding the lifeline 120 from the rotatable member 130) when the retractable lifeline assembly 100 is in the unlocked configuration.

On the other hand, when the retractable lifeline assembly 100 is in the locked configuration, the rotatable member 130 may be restricted from rotating in one or more directions. For example, the rotatable member 130 may be rotatable in only a single direction (e.g., for winding the lifeline 120 around the rotatable member 130 or unwinding the lifeline 120 from the rotatable member 130, but not both) when the retractable lifeline assembly 100 is in the locked configuration.

In some examples, the retractable lifeline assembly 100 includes a release mechanism 160 that is actuatable to move the retractable lifeline assembly 100 between the locked configuration and the unlocked configuration. The release mechanism 160 may be moved, for example, between a first position, in which the retractable lifeline assembly 100 is in the locked configuration, and a second position, in which the retractable lifeline assembly 100 is in the unlocked configuration. The release mechanism 160 may be biased toward the first position or away from the second position, and/or away from the first position or toward the second position.

Figure 3:
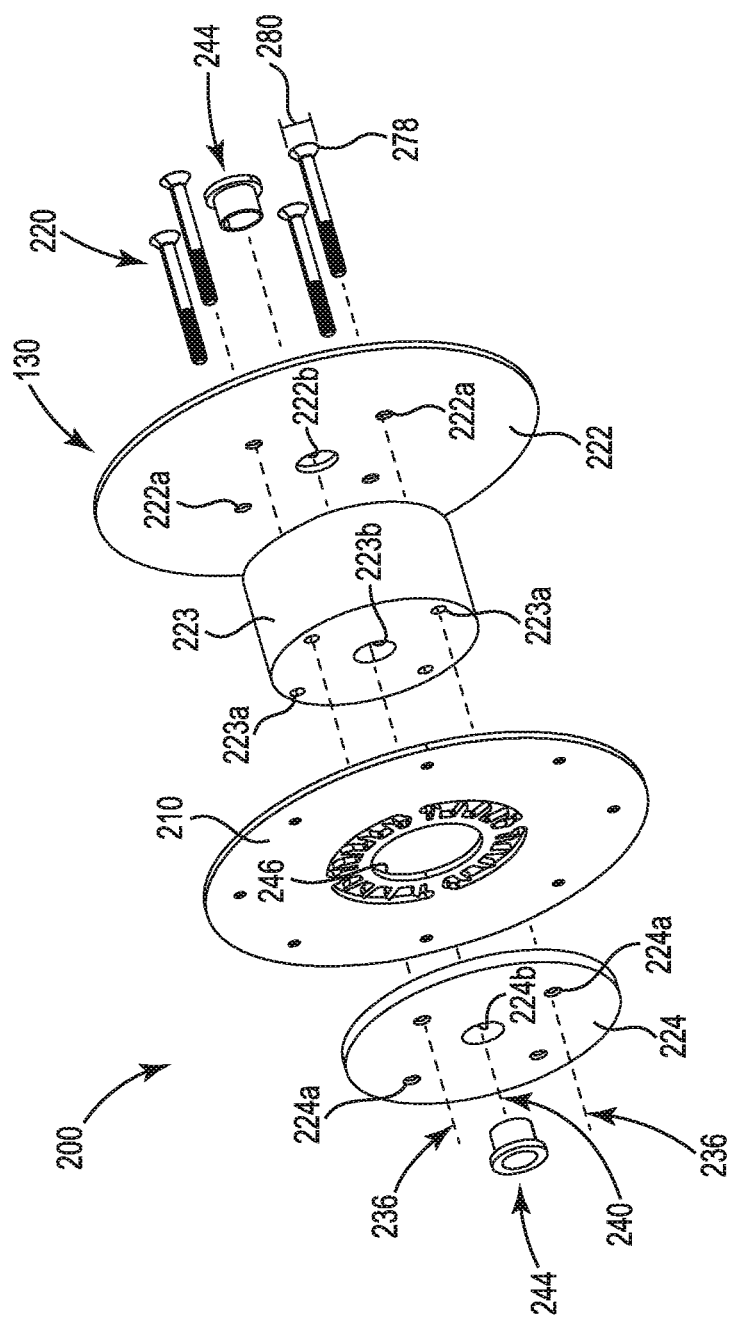
FIG. 3 includes an exploded perspective view of an example brake assembly that may be used in a retractable lifeline assembly, such as the retractable lifeline assembly shown in FIG. 1.

FIGS. 2 and 3 show a brake assembly 200 that may be used in the retractable lifeline assembly 100. The brake assembly 200 includes a rotatable member 130, a brake plate 210, and one or more extension members 220 coupling the brake plate 210 to the rotatable member 130.

In some examples, the rotatable member 130 includes a base 223 interconnecting a first portion 222 and a second portion 224. The base 223 is generally cylindrical and the first and second portions 222 and 224 form flanges extending outward from the base 223; and the base 223, the first portion 222, and second portion 224 are coaxial (e.g., they have a common axis of rotation). In some examples, one or more bores 236 extend through the rotatable member 130 and are formed by apertures 222a, 223a, and 224a in the first portion 222, the base 223, and the second portion 224, respectively.

The rotatable member 130 may include a bore 240 that extends axially through the rotatable member 130 at or proximate a radial center of the rotatable member 130 (e.g., along the axis of rotation). The bore 240 is formed by apertures 222b, 223b, and 224b in the first portion 222, the base 223, and the second portion 224, respectively. The rotatable member 130 may be configured to receive a shaft 242 in the bore 240 (e.g., the shaft 242 may extend through the bore 240). In some examples, one or more bearings 244 are used to manage or control a relative movement of the rotatable member 130 and/or shaft 242. The bearings 244 may include a flanged bushing that generally circumscribes the shaft 242 and/or is at least partially positionable in the bore 240.

The brake plate 210 includes an inner surface defining an opening 246 (e.g., plate opening) that extends axially through the brake plate 210 at or proximate a radial center of the brake plate 210 (e.g., along the axis of rotation). In some examples, the brake plate 210 and rotatable member 130 are coaxial (e.g., they have a common axis of rotation). In some examples, the brake plate 210 is positioned between the base 223 and the second portion 224.

The brake plate 210 includes one or more interior surfaces defining one or more elongated openings or slots 250 that extend axially through the brake plate 210 along one or more arcs at least partially circumscribing the radial center of the brake plate 210. The slots 250 may be sized to enable the brake plate 210 to receive one or more extension members 220 in one or more slots 250. Each slot 250 is configured to allow an extension member 220 to move longitudinally (e.g., along a longitudinal axis of the slot 250) within the slot 250. A slot 250 has a length 252 (e.g., along the longitudinal axis of the slot 250) between a first end portion 254 and a second end portion 256. The first end portion 254 may include a wall that defines a nook 258 configured to receive the extension member 220. The slot 250 provides a guide path for the extension member 220.

Between the first end portion 254 and second end portion 256, the brake plate 210 includes a plurality of radially-extending brake tabs 260 configured to at least partially restrict movement of the extension member 220 relative to the brake plate 210. The brake tabs 260 may extend laterally (e.g., generally perpendicular to the longitudinal axis of the slot 250) within the slot 250. That is, the brake tabs 260 may be between the first end portion 254 on a first side and the second end portion 256 on a second side. In some examples, the brake tabs 260 are cantilevered and extend radially outward from a radially-outward-facing surface defining a slot 250 and/or radially inward from a radially-inward-facing surface defining the slot 250. Alternatively, at least one brake tab 260 may extend from any surface in any configuration and/or orientation that enables the brake assembly 200 to function as described herein.

Figure 4:
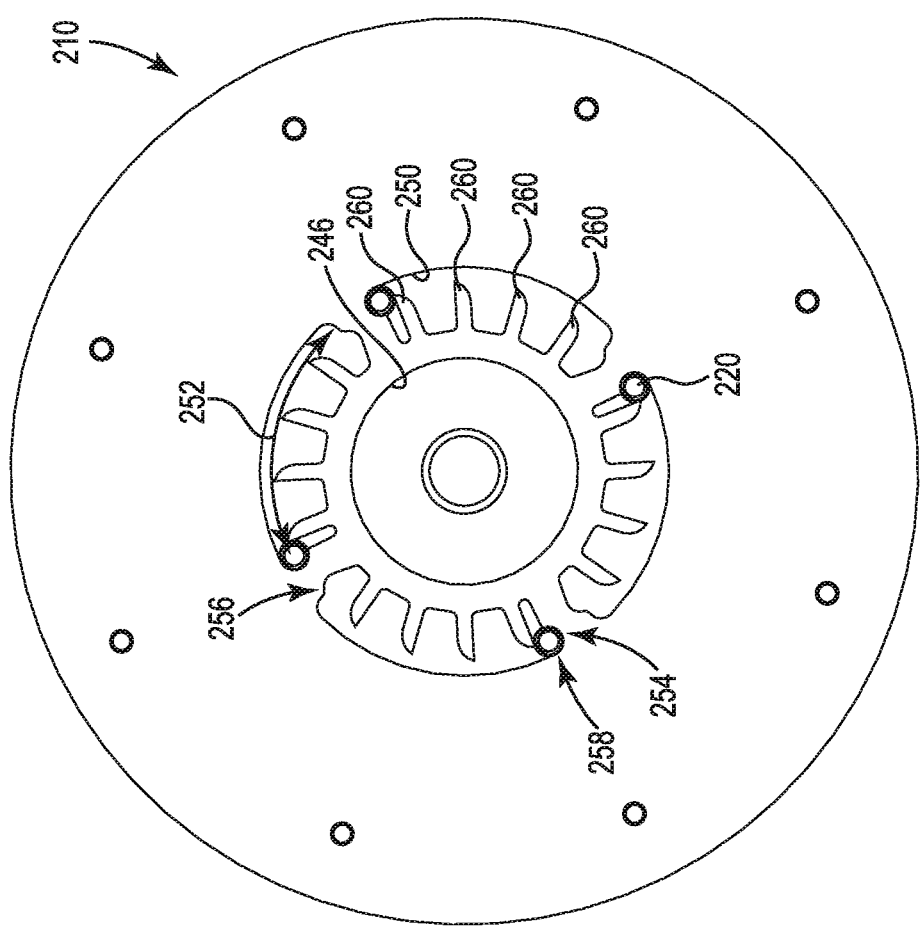
FIG. 4 includes a cross-sectional view of the brake assembly shown in FIG. 3 in a first position.

The brake tab 260 may be configured to maintain its general shape (e.g., extending laterally within the slot 250) until a force applied to a brake tab 260 satisfies a predetermined threshold. For example, the shape of the brake tab 260 may change when the force exceeds a predetermined threshold. FIG. 4 shows the brake assembly 200 in a first position, in which the extension members 220 are proximate the first end portions 254 and the brake tabs 260 are in a first shape or configuration. In a second position (not shown), the extension members 220 are proximate the second end portions 256 and the brake tabs 260 are in a second shape or configuration.

The brake tabs 260 have varying configurations (e.g., shape, thickness, material composition) that allow the brake tabs 260 to change shape or give way at various threshold ranges. For example, a first brake tab may be configured to change shape when a force applied to the first brake tab 260 (e.g., a first force) exceeds a predetermined first threshold, and a second brake tab 260 may be configured to change shape when a force applied to the second brake tab (e.g., a second force) exceeds a predetermined second threshold different from the predetermined first threshold.

In some examples, the brake tabs 260 are plastically deformable. For example, the brake tabs 260 may be configured to change from the first shape to the second shape (e.g., while generally maintaining the first shape) until a force applied to a brake tab 260 satisfies the predetermined threshold. After the predetermined threshold is satisfied, the brake tabs 260 may be configured to generally maintain the second shape.

The extension members 220 are extendable through the bores 236 and through the slot 250 to manage or control a relative movement of the brake plate 210 and/or rotatable member 130. In some examples, an extension member 220 includes a head 278 having a diameter 280 (e.g., a head outer diameter) greater than an inner diameter of the bores 236 and/or through the slot 250. The extension members 220 may include a fastener, such as a bolt and/or pin. Additionally or alternatively, the extension members 220 may include any mechanism configured to couple the brake plate 210 to the rotatable member 130.

FIG. 2 shows a plurality of components 500 that may be used in the retractable lifeline assembly 100. The components 500 include a housing 110, a rotatable member 130 positioned in a cavity defined by the housing 110, and a lifeline 120 extendable around the rotatable member 130. In some examples, a first segment 132 of the lifeline 120 is wound around the rotatable member 130, and a second segment 134 of the lifeline 120 is extended from the rotatable member 130 and outside the housing 110 (e.g., beyond a sidewall 112 of the housing 110).

One or more gears 510 (e.g., a gear train) may be coupled to the brake plate 210 for managing or controlling a rotation of the rotatable member 130. The gears 510, for example, may couple the rotatable member 130 to a shank 140 (shown in FIGS. 1 and 2) such that the shank 140 is configured to rotate the rotatable member 130. In some examples, the gears 510 have a gear ratio that enables a mechanical advantage to be created when the shank 140 is rotated for rotating the rotatable member 130. The shank 140 extends outward from and generally perpendicular to an outer surface of a sidewall 112 of the housing 110 to allow a clamp or chuck to hold the shank 140.

Figure 1A:
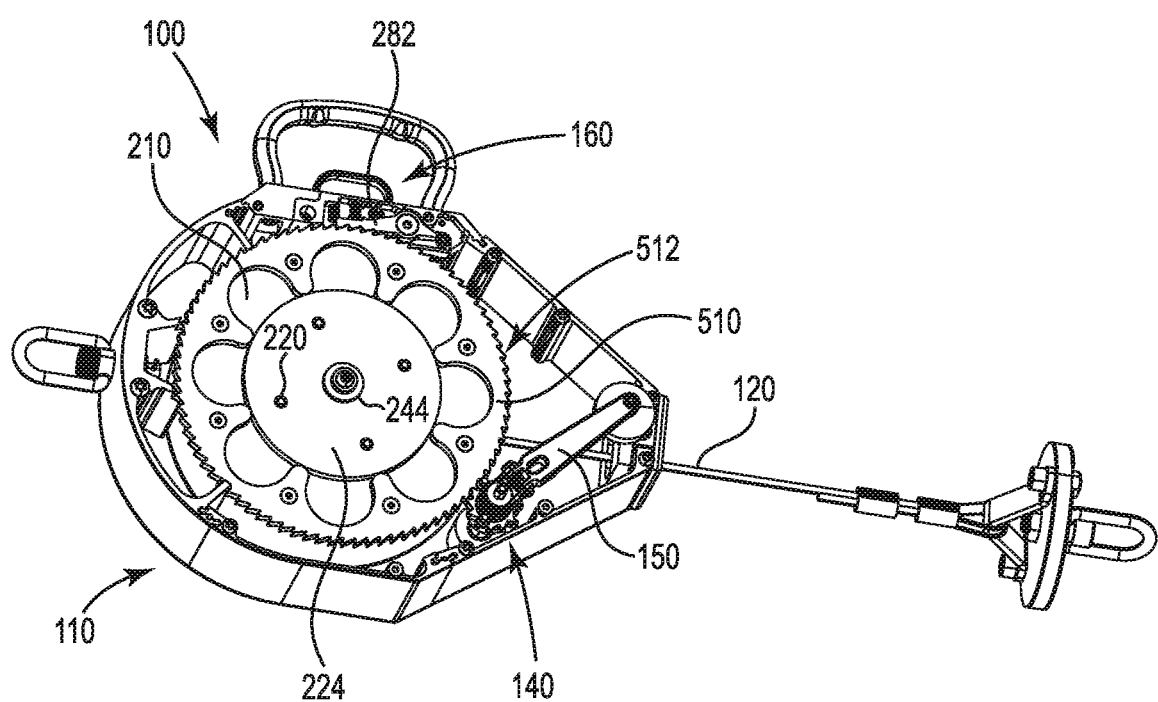
FIG. 1A includes a perspective view of the retractable lifeline assembly shown in FIG. 1 with a sidewall removed.

A gear 510 may include a plurality of teeth 512 (e.g., a first engagement member) that are configured to cooperate with and/or engage at least one pawl 282 (e.g., a second engagement member). This is shown in FIG. 1A. The at least one pawl 282 is movable between a first position and a second position. The pawl 282 may be biased or urged toward the first position and/or away from the second position, for example, using one or more biasing members 284 (e.g., a spring). In some examples, the pawl 282 is movable between the first position and the second position using the release mechanism 160 (shown in FIGS. 1, 1A, and 2). The release mechanism 160 may be actuated to move the pawl 282, for example, away from the first position and/or toward the second position. In some examples, the retractable lifeline assembly 100 is in a locked configuration (shown in FIG. 1A) when the pawl 282 is in a first position, and in an unlocked configuration when the pawl 282 is in a second position. For example, the pawl 282 may be positioned to engage at least one tooth 512 when in the first position, and spaced from the teeth 512 when in the second position.

The gear 510 may be rotated in a first direction when the pawl 282 is in the first position. As a rotational force is applied to the gear 510 in the first direction (e.g., by rotating the rotatable member 130 and/or shank 140), each tooth 512 successively engages the pawl 282 to move the pawl 282 away from the first position and toward the second position until the pawl 282 is cleared, when the next tooth 512 is positioned to engage the pawl 282. Each tooth 512 may have, for example, a moderate slope on a first edge that allows the pawl 282 to slide or move up the first edge as the gear 510 is rotated in the first direction. When the tip of the tooth 512 is moved past the pawl 282, the pawl 282 moves back toward the first position such that the pawl 282 is positioned to engage the next tooth 512.

On the other hand, the gear 510 may be restricted from rotating in a second direction when the pawl 282 is in the first position. When a rotational force is applied to the gear 510 in the second direction (e.g., via the rotatable member 130 and/or shank 140) while the pawl 282 is in the first position, the pawl 282 acts as a mechanical stop and restricts the gear 510 from rotating. Each tooth 512 may have, for example, a steeper slope on a second edge that restricts the pawl 282 from moving up the second edge.

In this manner, the gear 510 may be selectively rotated in the first direction only when the pawl 282 is in the first position. When the pawl 282 is in the second position, the pawl 282 is disengaged from the teeth 512 such that the gear 510 may be selectively rotated in either the first direction or the second direction.

A plurality of components 500, including a lifeline 120, a rotatable member 130, a brake assembly 200, and one or more gears 510, may be positioned inside a housing 110. One or more extension members 220 are extended through the first portion 222 (apertures 222a), the base 223 (bores 223a), and/or brake plate 210. The extension members 220 may be received in a nook 258 defined by a wall or interior surface of the brake plate 210 at the first end portion 254. The extension members 220 are coupled to the second portion 224 (apertures 224a) for managing or controlling a relative movement of the collar 270, brake plate 210, and/or rotatable member 130.

During operation, a crank 150 may be used to selectively rotate the rotatable member 130 (e.g., via the shank 140 and gears 510). When a rotational force is applied to the rotatable member 130 for tensioning the lifeline 120 (e.g., by rotating the crank 150), the rotatable member 130 experiences a rotational impulse and urges the extension members 220 to move with the rotatable member 130 (e.g., revolve around the first axis of rotation 136 as the rotatable member 130 is rotated about the first axis of rotation 136), which urges the collar 270 and/or brake plate 210 to move with the extension members 220 (e.g., rotate about the first axis of rotation 136 as the extension members 220 are revolved around the first axis of rotation 136).

In some examples, the brake plate 210 is independently secured against the rotational impulse and/or restricted from rotating relative to the rotatable member 130 (e.g., via one or more teeth 512, pawls 282, and/or a passively-engaged manual brake). When the rotatable member 130 experiences the rotational impulse against a relatively-stationary brake plate 210, each extension member 220 is urged to move circumferentially along a respective arc from the first end portion 254 and/or towards the second end portion 256. As the extension members 220 are moved from the first end portions 254 towards the second end portions 256, each extension member 220 successively engages the brake tabs 260 within a respective slot 250 to apply a force to each brake tab 260 until a predetermined threshold is satisfied.

In some examples, each brake tab 260 withstands the force applied by the extension member 220, thereby at least partially restricting movement of the rotatable member 130, and maintains its general shape (e.g., as shown in FIG. 4) until the force exceeds the predetermined threshold, when the brake tab 260 gives way and allows the extension member 220 to engage the next brake tab 260. After clearing the last brake tab 260 (i.e., the brake tab 260 closest to the second end portion 256) within the slot 250, the extension member 220 engages the second end portion 256, which acts as a mechanical stop and restricts farther movement of the extension member 220 (and, thus, rotation of the rotatable member 130). In addition, the brake assembly acts as an energy absorber.

Figure 5:
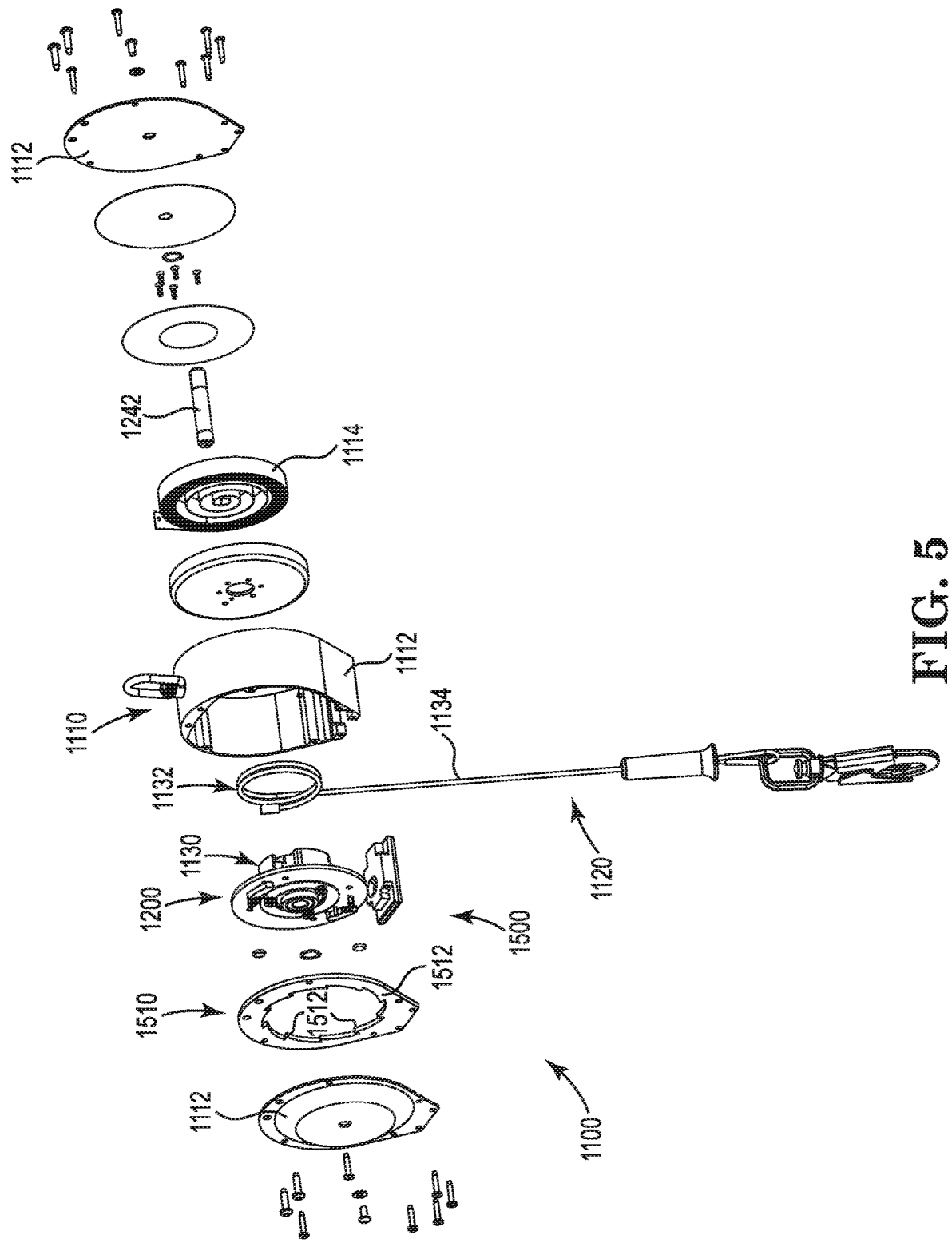
FIG. 5 includes an exploded perspective view of another example retractable lifeline assembly.

FIG. 5 shows an example retractable lifeline system or assembly 1100, which is a self-retracting lifeline assembly, including a housing 1110. The housing 1110 includes one or more sidewalls 1112 that are spaced to form a cavity therebetween. The sidewalls 1112 may be spaced, for example, to house one or more components, such as a lifeline 1120.

The lifeline 1120 is extendable about and/or from a drum or rotatable member 1130 in the housing 1110. The lifeline 1120 may have, for example, a first segment 1132 extending about the rotatable member 1130 inside the housing 1110 (e.g., an inner segment), and a second segment 1134 extending from the rotatable member 1130 outside the housing 1110 (e.g., an outer segment). In some examples, the lifeline 1120 extends through an opening defined by and/or through one or more sidewalls 1112. Example lifelines 1120 include, without limitation, a cable, a wire, a cord, a webbing, and/or a rope.

A proportion of the lifeline 1120 in the first segment 1132 and/or in the second segment 1134 changes as the rotatable member 1130 is rotated about its axis of rotation. For example, a proportion of the lifeline 1120 in the first segment 1132 may increase and a proportion of the lifeline 1120 in the second segment 1134 may decrease when the rotatable member 1130 rotates in a first direction (e.g., a clockwise direction), and a proportion of the lifeline 1120 in the first segment 1132 may decrease and a proportion of the lifeline 1120 in the second segment 1134 may increase when the rotatable member 1130 rotates in a second direction (e.g., a counterclockwise direction).

In some examples, the retractable lifeline assembly 1100 includes a biasing mechanism 1114 that may be used to rotate the rotatable member 1130. The biasing mechanism 1114 interconnects the housing 1110 and the rotatable member 1130 and places a biasing force on the rotatable member 1130 so that after a portion of the lifeline 1120 is paid out, the lifeline 1120 is wound about the rotatable member 1130 when tension on the lifeline 1120 is released. An example of a biasing mechanism 1114 that could be used is a motor spring.

The retractable lifeline assembly 1100 has a plurality of operating configurations including an unlocked configuration and a locked configuration. When the retractable lifeline assembly 1100 is in the unlocked configuration, the rotatable member 1130 is allowed to freely rotate in a plurality of directions. For example, the rotatable member 1130 may be selectively rotated in a first direction (e.g., for winding the lifeline 1120 around the rotatable member 1130) or in a second direction (e.g., for unwinding the lifeline 1120 from the rotatable member 1130).

On the other hand, when the retractable lifeline assembly 1100 is in the locked configuration, the rotatable member 1130 may be restricted from rotating in one or more directions. For example, the rotatable member 1130 may be rotatable in only a single direction (e.g., for winding the lifeline 1120 around the rotatable member 1130).

Figure 6:
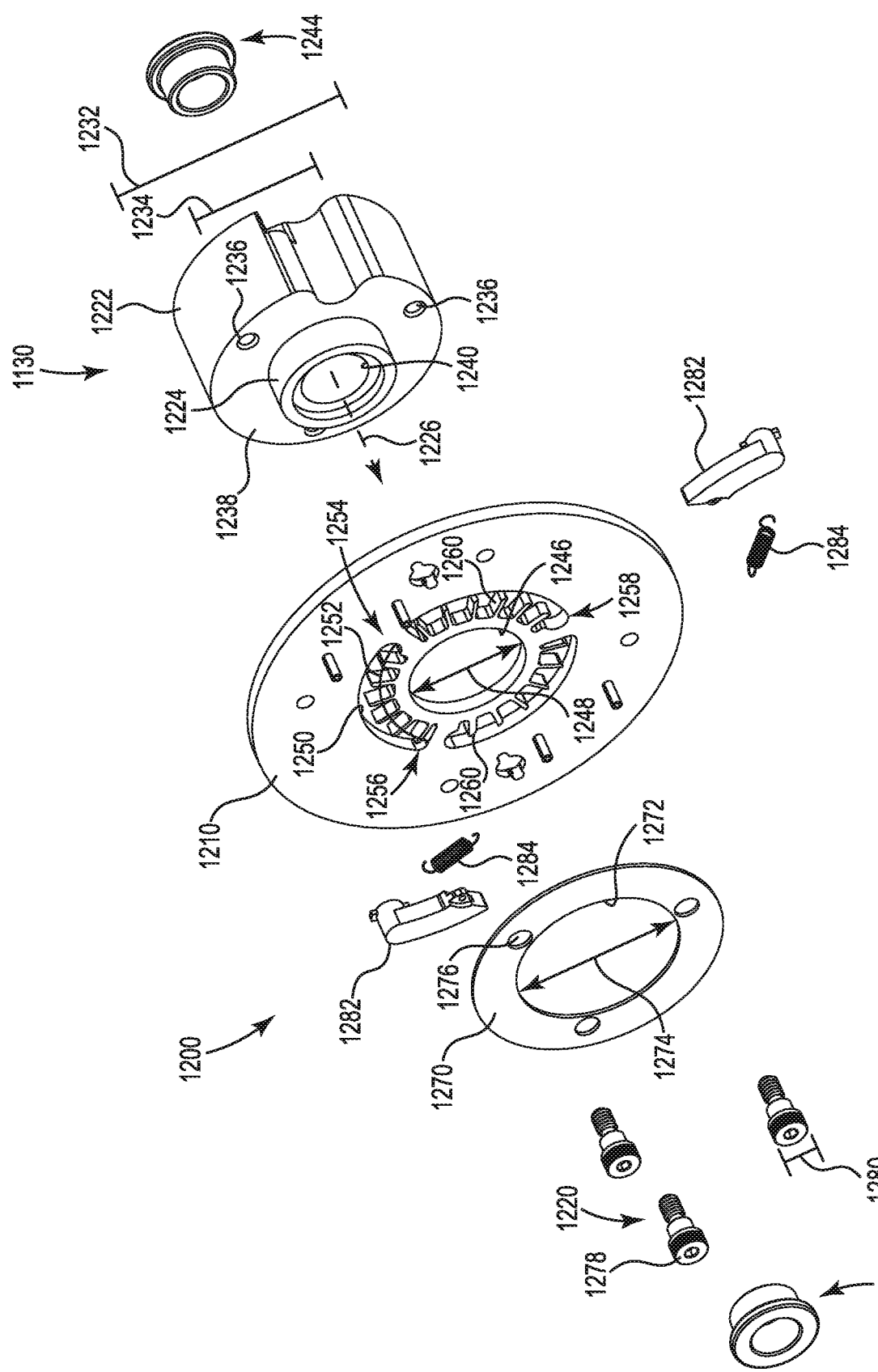
FIG. 6 includes an exploded perspective view of an example brake assembly that may be used in a retractable lifeline assembly, such as the retractable lifeline assembly shown in FIG.

FIG. 6 shows a brake assembly 1200 that may be used in the retractable lifeline assembly 1100. The brake assembly 1200 includes a rotatable member 1130, a brake plate 1210, and one or more extension members 1220 coupling the brake plate 1210 to the rotatable member 1130.

In some examples, the rotatable member 1130 includes a first portion 1222 and a second portion 1224 coupled to the first portion 1222. The second portion 1224 may extend from the first portion 1222 in a first axial direction 1226. In some examples, the first portion 1222 and second portion 1224 are coaxial (e.g., they have a common axis of rotation). The first portion 1222 includes an outer surface having a diameter 1232 (e.g., a first drum outer diameter), and the second portion 1224 includes an outer surface having a diameter 1234 (e.g., a second drum outer diameter) less than the first drum outer diameter 1232. In some examples, one or more openings 1236 (e.g., drum openings) are defined in the rotatable member 1130 at a surface 1238 of the first portion 1222 facing the first axial direction 1226 and/or circumscribing the second portion 1224.

The rotatable member 1130 may include an inner surface defining a bore 1240 that extends axially through the rotatable member 1130 at or proximate a radial center of the rotatable member 1130 (e.g., along the axis of rotation). The rotatable member 1130 may be configured to receive a shaft 1242 (shown in FIG. 5) in the bore 1240 (e.g., the shaft 1242 may extend through the bore 1240). In some examples, one or more bearings 1244 are used to manage or control a relative movement of the rotatable member 1130 and/or shaft 1242. The bearings 1244 may include a flanged bushing that generally circumscribes the shaft 1242 and/or is at least partially positionable in the bore 1240.

The brake plate 1210 includes an inner surface defining an opening 1246 (e.g., plate opening) that extends axially through the brake plate 1210 at or proximate a radial center of the brake plate 1210 (e.g., along the axis of rotation). In some examples, the brake plate 1210 and rotatable member 1130 are coaxial (e.g., they have a common axis of rotation). The plate opening 1246 may be sized to enable the brake plate 1210 to receive the second portion 1224 in the plate opening 1246 (e.g., the second portion 1224 may extend through the plate opening 1246). In some examples, the inner surface defining the plate opening 1246 has a diameter 1248 (e.g., a plate inner diameter) greater than the second drum outer diameter 1234 and less than the first drum outer diameter 1232.

In some examples, the brake plate 1210 includes one or more interior surfaces defining one or more elongated openings or slots 1250 that extend axially through the brake plate 1210 along one or more arcs at least partially circumscribing the radial center of the brake plate 1210. The slots 1250 may be sized to enable the brake plate 1210 to receive one or more extension members 1220 in one or more slots 1250. Each slot 1250 is configured to allow an extension member 1220 to move longitudinally (e.g., along a longitudinal axis of the slot 1250) within the slot 1250. A slot 1250 has a length 1252 (e.g., along the longitudinal axis of the slot 1250) between a first end portion 1254 and a second end portion 1256. The first end portion 1254 may include a wall that defines a nook 1258.

Between the first end portion 1254 and second end portion 1256, the brake plate 1210 includes a plurality of radially-extending brake tabs 1260 configured to at least partially restrict movement of the extension member 1220 relative to the brake plate 1210. The brake tabs 1260 may extend laterally (e.g., generally perpendicular to the longitudinal axis of the slot 1250) within the slot 1250. That is, the brake tabs 1260 may be between the first end portion 1254 on a first side and the second end portion 1256 on a second side. In some examples, the brake tabs 1260 are cantilevered and extend radially outward from a radially-outward-facing surface defining a slot 1250 and/or radially inward from a radially-inward-facing surface defining the slot 1250. Alternatively, at least one brake tab 1260 may extend from any surface in any configuration and/or orientation that enables the brake assembly 1200 to function as described herein.

Figure 7:
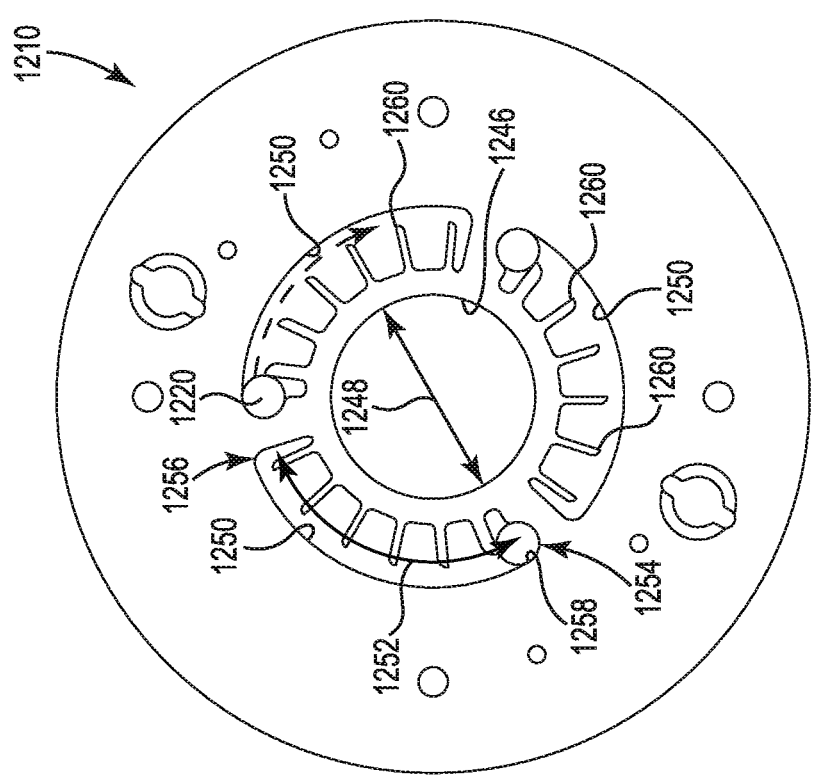
FIG. 7 includes a cross-sectional view of the brake assembly shown in FIG. 6 in a first position.
Figure 8:
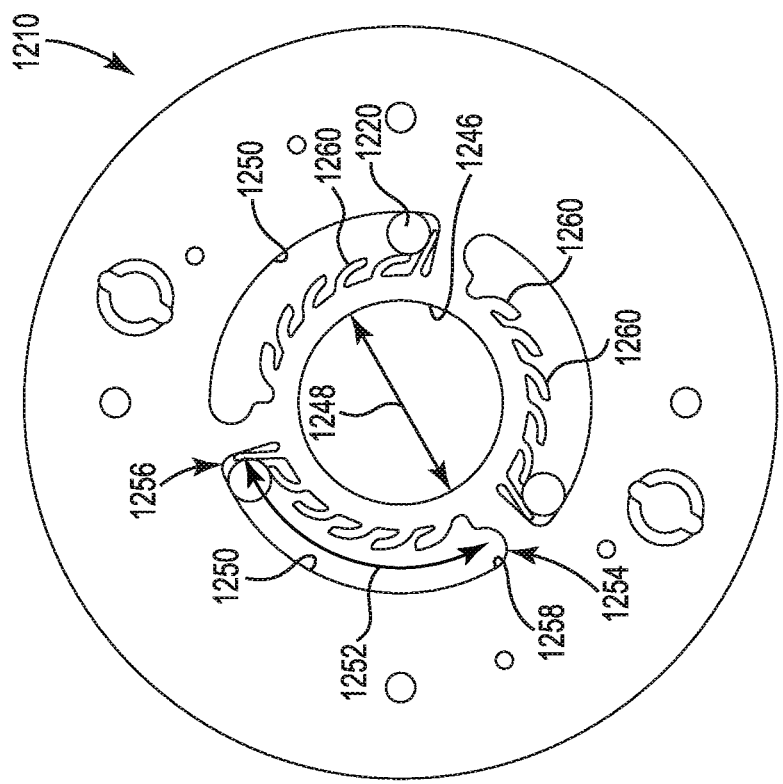
FIG. 8 includes a cross-sectional view of the brake assembly shown in FIG. 6 in a first position.

The brake tab 1260 may be configured to maintain its general shape (e.g., extending laterally within the slot 1250) until a force applied to a brake tab 1260 satisfies a predetermined threshold. For example, the shape of the brake tab 1260 may change when the force exceeds a predetermined threshold. FIG. 7 shows the brake assembly 1200 in a first position, in which the extension members 1220 are proximate the first end portions 1254 and the brake tabs 1260 are in a first shape or configuration. FIG. 8 shows the brake assembly 1200 in a second position, which the extension members 1220 are proximate the second end portions 1256 and the brake tabs 1260 are in a second shape or configuration.

The brake tabs 1260 have varying configurations (e.g., shape, thickness, material composition) that allow the brake tabs 1260 to change shape or give way at various threshold ranges. For example, a first brake tab may be configured to change shape when a force applied to the first brake tab (e.g., a first force) exceeds a predetermined first threshold, and a second brake tab may be configured to change shape when a force applied to the second brake tab (e.g., a second force) exceeds a predetermined second threshold different from the predetermined first threshold.

In some examples, the brake tabs 1260 are plastically deformable. For example, the brake tabs 1260 may be configured to change from the first shape to the second shape (e.g., while generally maintaining the first shape) until a force applied to a brake tab 1260 satisfies the predetermined threshold. After the predetermined threshold is satisfied, the brake tabs 1260 may be configured to generally maintain the second shape.

In some examples, the brake assembly 1200 includes a collar 1270. The collar 1270 includes an inner surface defining a first opening 1272 (e.g., a first collar opening) that extends axially through the collar 1270 at or proximate a radial center of the collar 1270 (e.g., along the axis of rotation). In some examples, the collar 1270 has a common axis of rotation with the rotatable member 1130 and/or brake plate 1210. The first collar opening 1272 may be sized to enable the collar 1270 to receive the shaft 1242 and/or the second portion 1224 in the first collar opening 1272 (e.g., the shaft 1242 and/or second portion 1224 may extend through the first collar opening 1272). In some examples, the inner surface defining the first collar opening 1272 has a diameter 1274 (e.g., a collar inner diameter) greater than the second drum outer diameter 1234 and/or the plate inner diameter 1248, and less than the first drum outer diameter 1232.

The collar 1270 may include one or more interior surfaces defining one or more second openings 1276 (e.g., second collar openings) spaced about the first collar opening 1272. The second collar openings 1276 may extend axially through the collar 1270 at one or more locations corresponding to the drum openings 1236. The second collar opening 1276 may be sized to enable the collar 1270 to receive an extension member 1220 in the second collar opening 1276 (e.g., the extension member 1220 may extend through the second collar opening 1276). The size, shape, and/or positioning of the second collar openings 1276 enable the collar 1270 to maintain a relative spacing of the extension members 1220.

The extension members 1220 are extendable through the second collar openings 1276, through the slot 1250, and/or into the drum openings 1236 to manage or control a relative movement of the collar 1270, brake plate 1210, and/or rotatable member 1130. In some examples, an extension member 1220 includes a head 1278 having a diameter 1280 (e.g., a head outer diameter) greater than an inner diameter of the second collar openings 1276, through the slot 1250, and/or into the drum openings 1236. The extension members 1220 may include a fastener, such as a bolt and/or pin. Additionally or alternatively, the extension members 1220 may include any mechanism configured to couple the brake plate 1210 to the rotatable member 1130.

In some examples, the brake plate 1210 is coupled to one or more engagement member. An example engagement member is at least one pawl 1282 that is movable between a first position and a second position. The pawl 1282 may be biased or urged toward the first position and/or away from the second position, for example, using one or more biasing member 1284 (e.g., a torsion spring). Another example engagement member is a gear 1510 (e.g., a gear train) including a plurality of teeth 1512 configured and arranged to be engaged by the pawl 1282 when the pawl 1282 is in the second position.

FIG. 5 shows a plurality of components 1500 that may be used in the retractable lifeline assembly 1100. The components 1500 include a housing 1110, a rotatable member 1130 positioned in a cavity defined by the housing 1110, and a lifeline 1120 extendable around the rotatable member 1130. In some examples, a first segment 1132 of the lifeline 1120 is wound around the rotatable member 1130, and a second segment 1134 of the lifeline 1120 is extended from the rotatable member 1130 and outside the housing 1110 (e.g., beyond a sidewall 1112 of the housing 1110).

A brake assembly 1200 is coupled to the rotatable member 1130 for managing or controlling a rotation of the rotatable member 1130. In some examples, the brake assembly 1200 includes at least one pawl 1282 pivotally connected to the brake plate 1210. A biasing member 1284 interconnects the brake plate 1210 and the pawl 1282 to bias the pawl 1282 toward a first position. When the rotatable member 1130 rotates at a rotational velocity greater than a predetermined maximum rotational velocity, the biasing force of the biasing member 1284 is overcome thereby allowing the pawl 1282 to pivot from the first position to the second position and engage at least one of the teeth 1512 thereby placing the brake plate 1210 in a locked position so that it will not rotate.

In some examples, a gear 1510 is operatively connected to the housing 1110 and includes a plurality of teeth 1512 (e.g., a first engagement member) that are configured to cooperate with and/or engage at least one pawl 1282 (e.g., a second engagement member) of the brake assembly 1200. In some examples, the retractable lifeline assembly 1100 is in an unlocked configuration when the pawl 1282 is in a first position, and in a locked configuration when the pawl 1282 is in a second position. For example, the pawl 1282 may be positioned to engage at least one tooth 1512 when in the second position, and spaced from the teeth 1512 when in the first position.

Figure 9:
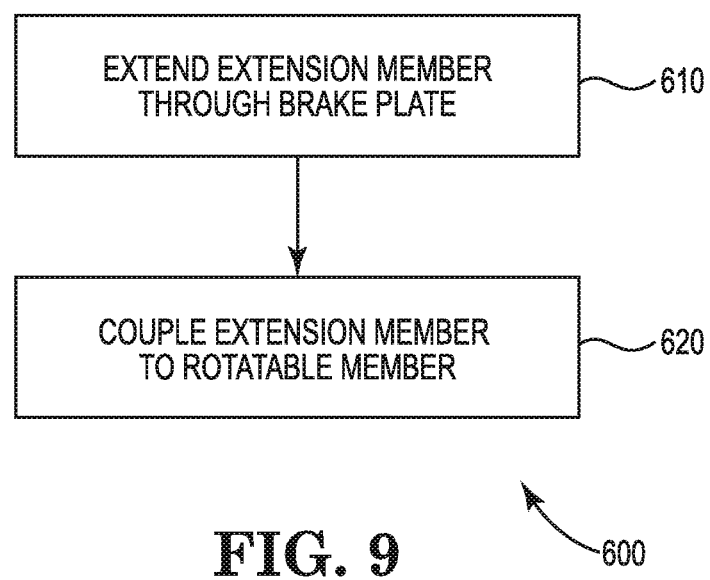
FIG. 9 includes a flowchart of an example method of manufacturing a retractable lifeline assembly, such as the retractable lifeline assembly shown in FIG. 5.

FIG. 9 shows an example method 600 of manufacturing a retractable lifeline assembly. During assembly, one or more extension members 1220 are extended through the collar 1270 (collar opening 1276) and the brake plate 1210 at operation 610. The extension members 1220 may be received in a nook 1258 defined by a wall or interior surface of the brake plate 1210 at the first end portion 1254. The extension members 1220 are coupled to the rotatable member 1130 (drum opening 1236) for managing or controlling a relative movement of the collar 1270, brake plate 1210, and/or rotatable member 1130 at operation 620.

In use, the rotational member 1130 rotates to pay out and to retract the lifeline 1120. Should the rotational member 1130 exceed a predetermined maximum rotational velocity, the at least one pawl 1282 pivots from the first position to the second position and engages at least one of the teeth 1512 to place the brake plate 1210 in the locked position. In this example, the brake plate 1210 is independently secured against the rotational impulse and/or restricted from rotating relative to the rotatable member 1130. When the rotatable member 1130 experiences the rotational impulse against a relatively-stationary brake plate 1210, each extension member 1220 is urged to move circumferentially along a respective arc from the first end portion 1254 and/or towards the second end portion 1256. As the extension members 1220 are moved from the first end portions 1254 towards the second end portions 1256, each extension member 1220 successively engages the brake tabs 1260 within a respective slot 1250 to apply a force to each brake tab 1260 until a predetermined threshold is satisfied.

In some examples, each brake tab 1260 withstands the force applied by the extension member 1220, thereby at least partially restricting movement of the rotatable member 1130, and maintains its general shape (e.g., as shown in FIG. 7) until the force exceeds the predetermined threshold, when the brake tab 1260 gives way and allows the extension member 1220 to engage the next brake tab 1260. After clearing the last brake tab 1260 (i.e., the brake tab 1260 closest to the second end portion 1256) within the slot 1250, the extension member 1220 engages the second end portion 1256, which acts as a mechanical stop and restricts farther movement of the extension member 1220 and, thus, rotation of the rotatable member 1130 (e.g., as shown in FIG. 8). In addition, the brake assembly acts as an energy absorber.

Example safety equipment are described herein and illustrated in the accompanying drawings. The examples described herein provide a brake assembly including a plurality of brake tabs that allow a rotational impulse to be diminished and/or a force reduction to change throughout a braking event (e.g., a fall arrest event). For example, the brake tabs may deform in a fashion that allows an impact various forces have during the braking event to be managed or controlled. This written description uses examples to disclose aspects of the disclosure and also to enable a person skilled in the art to practice the aspects, including making or using the above-described systems and executing or performing the above-described methods.

Having described aspects of the disclosure in terms of various examples with their associated operations, it will be apparent that modifications and variations are possible without departing from the scope of the disclosure as defined in the appended claims. That is, aspects of the disclosure are not limited to the specific examples described herein, and all matter contained in the above description and shown in the accompanying drawings shall be interpreted as illustrative and not in a limiting sense. For example, the examples described herein may be implemented and utilized in connection with many other applications such as, but not limited to, safety equipment.

Components of the systems and/or operations of the methods described herein may be utilized independently and separately from other components and/or operations described herein. Moreover, the methods described herein may include additional or fewer operations than those disclosed, and the order of execution or performance of the operations described herein is not essential unless otherwise specified. That is, the operations may be executed or performed in any order, unless otherwise specified, and it is contemplated that executing or performing a particular operation before, contemporaneously with, or after another operation is within the scope of the disclosure. Although specific features of various examples of the disclosure may be shown in some drawings and not in others, this is for convenience only. In accordance with the principles of the disclosure, any feature of a drawing may be referenced and/or claimed in combination with any feature of any other drawing.

When introducing elements of the disclosure or the examples thereof, the articles "a," "an," "the," and "said" are intended to mean that there are one or more of the elements. References to an "embodiment" or an "example" of the present disclosure are not intended to be interpreted as excluding the existence of additional embodiments or examples that also incorporate the recited features. The terms "comprising," "including," and "having" are intended to be inclusive and mean that there may be elements other than the listed elements. The phrase "one or more of the following: A, B, and C" means "at least one of A and/or at least one of B and/or at least one of C."

The patentable scope of the invention is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal language of the claims.

The invention claimed is:

1. A brake assembly, comprising:
   a brake plate including a plurality of radially-extending brake tabs; and
   an extension member extending at least partially through the brake plate, one of the brake plate and the extension member movable relative to another of the brake plate and the extension member such that the extension member is configured to successively engage the plurality of radially-extending brake tabs, wherein during operation a first brake tab of the plurality of radially-extending brake tabs is configured to plastically deform when a force applied to the first brake tab satisfies a predetermined threshold.

2. The brake assembly of claim 1 further comprising an engagement member configured to restrict a rotation of the brake plate.

3. The brake assembly of claim 1 further comprising a first engagement member, wherein the brake plate includes a second engagement member configured to selectively engage the first engagement member when a first force is applied to move the extension member in a first direction.

4. The brake assembly of claim 1 further comprising:
   a release mechanism; and
   a first engagement member, wherein the brake plate includes a second engagement member, the release mechanism actuatable to move one of the first engagement member or the second engagement member between a first position in which the one of the first engagement member or the second engagement member is configured to engage another of the first engagement member or the second engagement member and a second position in which the one of the first engagement member or the second engagement member is restricted from engaging the other of the first engagement member or the second engagement member.

5. The brake assembly of claim 1 further comprising:
   a biasing mechanism; and
   a first engagement member, wherein the brake plate includes a second engagement member, the biasing mechanism biasing the second engagement member toward a first position in which one of the first engagement member or the second engagement member is restricted from engaging the other of the first engagement member or the second engagement member.

6. The brake assembly of claim 1, wherein a second brake tab of the plurality of radially-extending brake tabs is configured to plastically deform when a second force applied to the second brake tab exceeds a predetermined second threshold different from the predetermined first threshold.

7. The brake assembly of claim 1, wherein the brake plate includes an end stop, the extension member movable toward the end stop when one or more of a first force is applied to move the extension member in a first direction or a second force is applied to rotate the brake plate in a second direction.

8. The brake assembly of claim 1, wherein the brake plate includes a wall defining a nook configured to receive the extension member.

9. The brake assembly of claim 1 further comprising:
   a rotatable member operatively connected to a housing and selectively rotatable relative to the housing, the brake plate being operatively connected to the rotatable member such that rotation of the rotatable member causes the extension member to successively engage the plurality of radially-extending brake tabs.

10. The brake assembly of claim 1, wherein the brake plate includes a guide path into which at least portions of the plurality of radially-extending brake tabs extend and through which the extension member at least partially extends, the extension member moving within the guide path when one of the brake plate and the extension members moves relative to another of the brake plate and the extension member.

11. A brake assembly, comprising:
a brake plate including a plurality of radially-extending brake tabs; and
an extension member extending at least partially through the brake plate, one of the brake plate and the extension member movable relative to another of the brake plate and the extension member such that the extension member is configured to successively engage the plurality of radially-extending brake tabs, wherein during operation a first brake tab of the plurality of radially-extending brake tabs is configured to plastically deform when a first force applied to the first brake tab exceeds a predetermined first threshold, and a second brake tab of the plurality of radially-extending brake tabs is configured to plastically deform when a second force applied to the second brake tab exceeds a predetermined second threshold different from the predetermined first threshold.

12. The brake assembly of claim 11 further comprising an engagement member configured to restrict a rotation of the brake plate.

13. The brake assembly of claim 11 further comprising a first engagement member, wherein the brake plate includes a second engagement member configured to selectively engage the first engagement member when the first force is applied to move the extension member in a first direction.

14. The brake assembly of claim 11 further comprising:
a release mechanism; and
a first engagement member, wherein the brake plate includes a second engagement member, the release mechanism actuatable to move one of the first engagement member or the second engagement member between a first position in which the one of the first engagement member or the second engagement member is configured to engage another of the first engagement member or the second engagement member and a second position in which the one of the first engagement member or the second engagement member is restricted from engaging the other of the first engagement member or the second engagement member.

15. The brake assembly of claim 11 further comprising:
a biasing mechanism; and
a first engagement member, wherein the brake plate includes a second engagement member, the biasing mechanism biasing the second engagement member toward a first position in which one of the first engagement member or the second engagement member is restricted from engaging the other of the first engagement member or the second engagement member.

16. The brake assembly of claim 11, wherein the brake plate includes an end stop, the extension member movable toward the end stop when one or more of the first force is applied to move the extension member in a first direction or the second force is applied to rotate the brake plate in a second direction.

17. The brake assembly of claim 11, wherein the brake plate includes a wall defining a nook configured to receive the extension member.

18. The brake assembly of claim 11 further comprising:
a rotatable member operatively connected to a housing and selectively rotatable relative to the housing, the brake plate being operatively connected to the rotatable member such that rotation of the rotatable member causes the extension member to successively engage the plurality of radially-extending brake tabs.

19. The brake assembly of claim 11, wherein the brake plate includes a guide path into which at least portions of the plurality of radially-extending brake tabs extend and through which the extension member at least partially extends, the extension member moving within the guide path when one of the brake plate and the extension members moves relative to another of the brake plate and the extension member.

* * * * *